(12) United States Patent
Nishikawa

(10) Patent No.: US 9,325,879 B2
(45) Date of Patent: Apr. 26, 2016

(54) INFORMATION PROCESSING APPARATUS, IMAGE PROCESSING APPARATUS AND IMAGE PROCESSING METHOD

(71) Applicant: Naoki Nishikawa, Nagoya (JP)

(72) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/845,786

(22) Filed: Mar. 18, 2013

(65) Prior Publication Data

US 2014/0104635 A1    Apr. 17, 2014

(30) Foreign Application Priority Data

Oct. 11, 2012   (JP) .................................. 2012-225721

(51) Int. Cl.
| | | |
|---|---|---|
| G06F 15/00 | (2006.01) | |
| H04N 1/333 | (2006.01) | |
| H04N 1/00 | (2006.01) | |
| H04N 1/327 | (2006.01) | |

(52) U.S. Cl.
CPC ....... *H04N 1/33346* (2013.01); *H04N 1/00238* (2013.01); *H04N 1/00307* (2013.01); *H04N 1/327* (2013.01); *H04N 2201/0041* (2013.01); *H04N 2201/0055* (2013.01); *H04N 2201/0075* (2013.01); *H04N 2201/0082* (2013.01)

(58) Field of Classification Search
None
See application file for complete search history.

(56) References Cited

U.S. PATENT DOCUMENTS

| | | | |
|---|---|---|---|
| 6,317,823 B1 | 11/2001 | Wakai et al. | |
| 7,221,465 B1 | 5/2007 | Shimada | |
| 8,379,249 B2 | 2/2013 | Kusakabe | |
| 2003/0103236 A1 | 6/2003 | Kato | |
| 2004/0170460 A1* | 9/2004 | Mokuya et al. ................. | 400/76 |
| 2006/0092433 A1 | 5/2006 | Stevens et al. | |
| 2008/0165379 A1* | 7/2008 | Zuber ............................ | 358/1.9 |
| 2009/0036056 A1* | 2/2009 | Oshima et al. ............... | 455/41.3 |
| 2009/0103124 A1 | 4/2009 | Kimura et al. | |
| 2009/0128853 A1 | 5/2009 | Kusakabe | |
| 2010/0202014 A1* | 8/2010 | Matsuyama ................. | 358/1.15 |
| 2011/0019228 A1 | 1/2011 | Uchikawa | |

(Continued)

FOREIGN PATENT DOCUMENTS

| | | |
|---|---|---|
| EP | 08-53273 A1 | 7/1998 |
| EP | 02-063352 A2 | 5/2009 |

(Continued)

OTHER PUBLICATIONS

European Search Report received in corresponding EP Application No. 13161728.4 mailed Jul. 23, 2013.

(Continued)

*Primary Examiner* — Helen Q Zong
(74) *Attorney, Agent, or Firm* — Banner & Witcoff, Ltd.

(57) ABSTRACT

An image processing system may be configured to perform communications using multiple communication protocols. The system may further obtain and transmit, to an information processing apparatus, connection information for one or more other image processing apparatuses or devices. In one example, communication between the information processing apparatus and a first image processing apparatus may be performed according to a first communication protocol while the connection information for the one or more other image processing apparatus may correspond to communications using a second communication protocol.

19 Claims, 13 Drawing Sheets

(56) References Cited

U.S. PATENT DOCUMENTS

| | | | |
|---|---|---|---|
| 2011/0117848 A1 | 5/2011 | Tanaka | |
| 2011/0177780 A1 | 7/2011 | Sato et al. | |
| 2013/0155455 A1* | 6/2013 | Ueda | 358/1.15 |
| 2013/0215467 A1* | 8/2013 | Fein | G06F 3/1204 358/1.15 |
| 2013/0321864 A1* | 12/2013 | Jintsugawa et al. | 358/1.15 |
| 2014/0148098 A1* | 5/2014 | Song | 455/41.1 |

FOREIGN PATENT DOCUMENTS

| | | |
|---|---|---|
| JP | 2001-290621 A | 10/2001 |
| JP | 2003-173250 A | 6/2003 |
| JP | 2003219094 A | 7/2003 |
| JP | 2004-336538 A | 11/2004 |
| JP | 2006-140946 A | 6/2006 |
| JP | 2007166538 A | 6/2007 |
| JP | 2010-011064 A | 1/2010 |
| JP | 2011028452 A | 2/2011 |
| JP | 2011146991 A | 7/2011 |

OTHER PUBLICATIONS

"Near Field Communication White Paper", Internet Citation; Feb. 12, 2004; URL:http://www.ecma-international.org/activities/Communications/2004tg19-001.pdf.

Oct. 9, 2015—(CN) Notification of First Office Action—App 201310084348.9.

Feb. 9, 2016—(JP) Office Action—App 2012-225721.

* cited by examiner

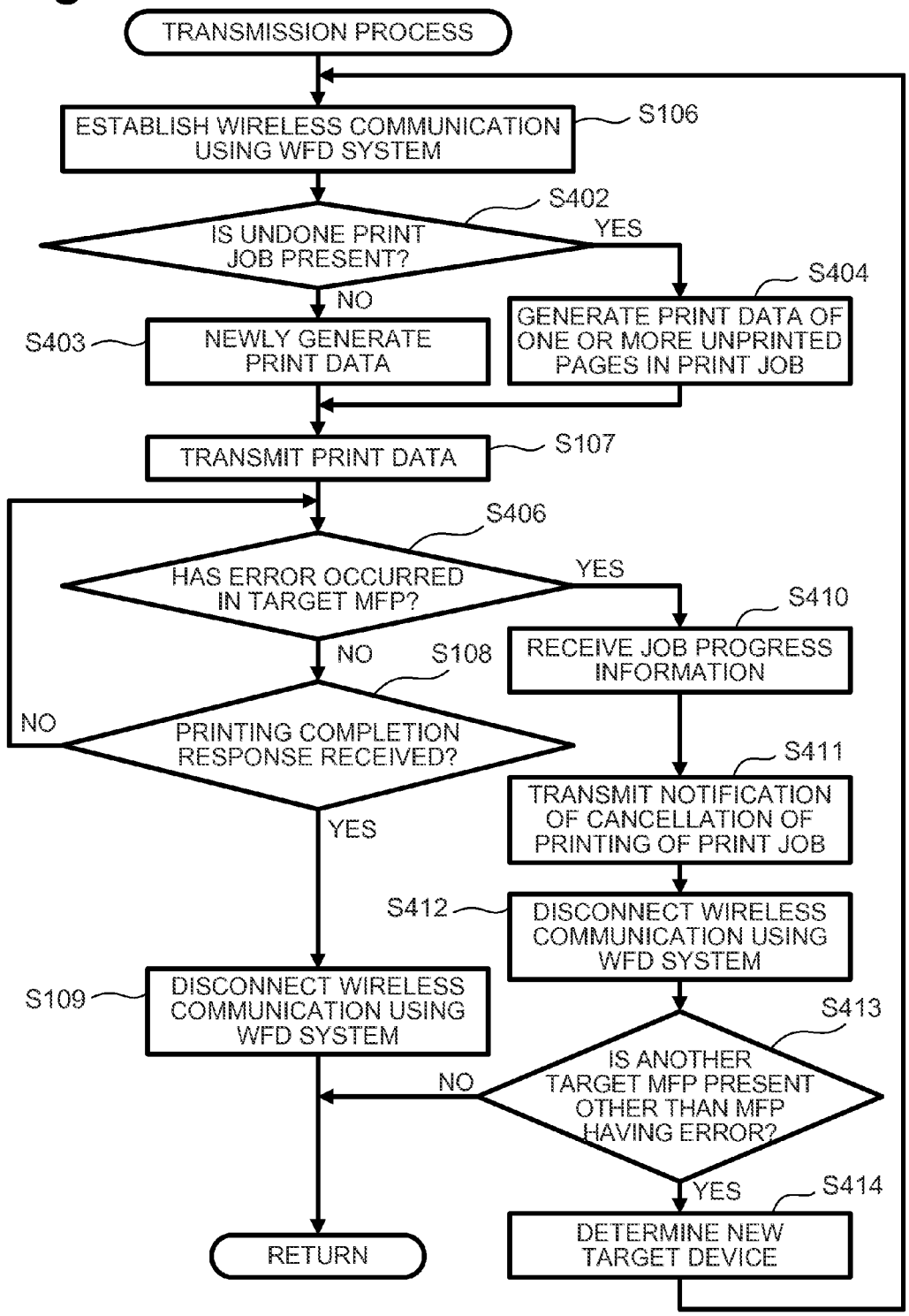

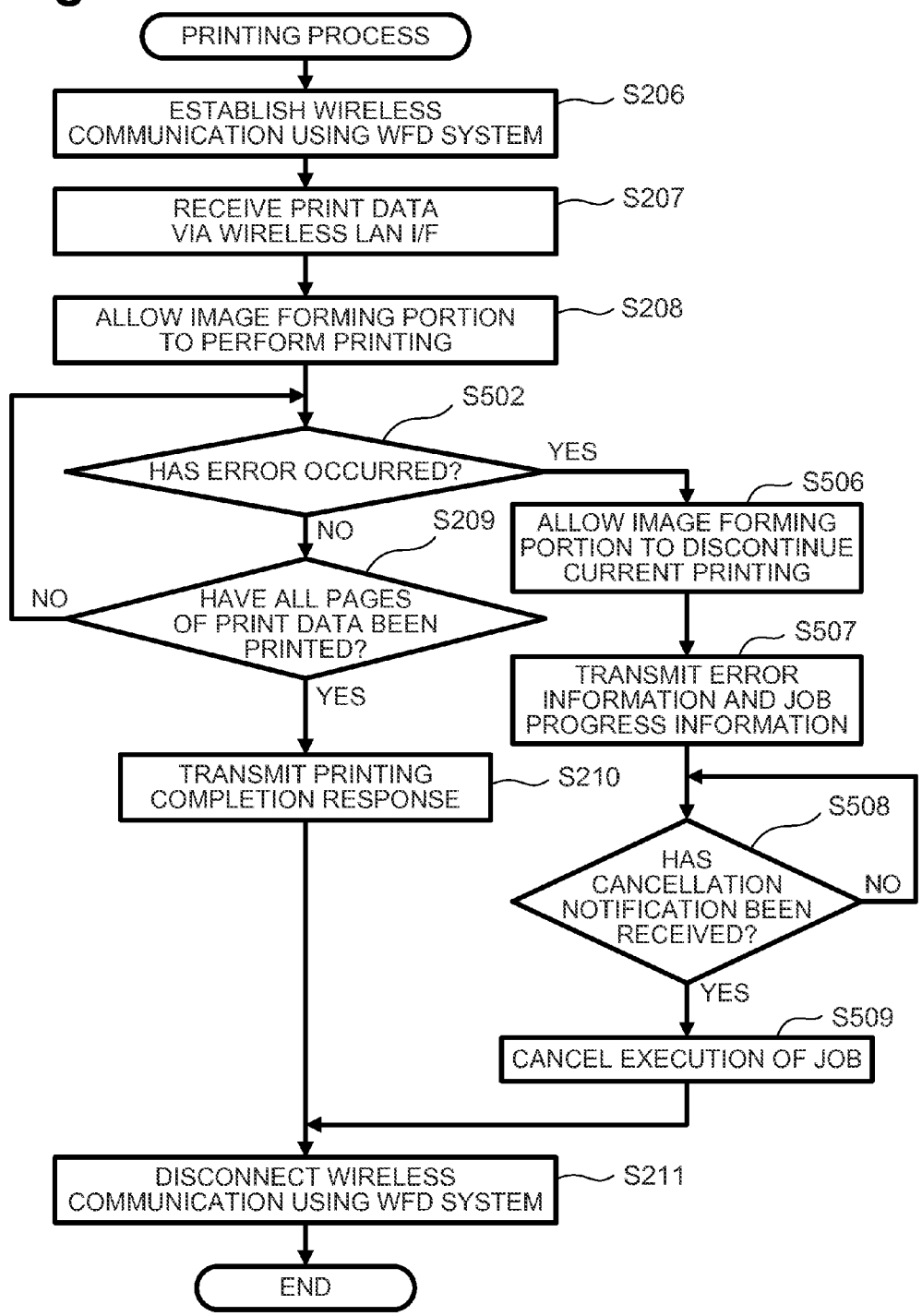

INFORMATION PROCESSING APPARATUS, IMAGE PROCESSING APPARATUS AND IMAGE PROCESSING METHOD

CROSS-REFERENCE TO RELATED APPLICATION

This application claims priority from Japanese Patent Application No. 2012-225721, filed on Oct. 11, 2012, which is incorporated herein by reference.

FIELD OF DISCLOSURE

Aspects described herein relate to printing print data by performing data communication between an image forming apparatus and an information processing device using a plurality of wireless communication methods.

BACKGROUND

Recently, a plurality of wireless communication methods, such as a Bluetooth® system (Bluetooth® is a registered trademark owned by BLUETOOTH SIG. INC. of Kirkland, Wash.), a Wireless Fidelity ("Wi-Fi®") system (Wi-Fi® is a registered certification mark owned by the Wi-Fi Alliance of Austin, Tex.), and a NFC system, have been available to wireless communication between an information processing device and an image forming apparatus. First, the NFC system is used for wireless communication to transmit or receive connection information between the information processing device and the image forming apparatus. Then, the wireless communication method is changed from the NFC system to another wireless communication method that has a longer communication range than the NFC system to transmit or receive print data therebetween. The above-described changing technique of the wireless communication method has been known as a handover technique.

SUMMARY

However, in order for the image forming device to print data after wireless communication is established between the information processing device and the image forming device by a handover, first, a user may need to move to a location where the image forming device is installed to allow the information processing device and the image forming device to perform communication using the NFC system therebetween. This action may impose an inconvenience on the user.

Accordingly, aspects described herein provide for a technique for increasing user convenience when the user allows an image forming apparatus to print data after a handover is performed.

According to other aspects, user convenience when the user allows the image forming apparatus to print data after a handover is performed may be improved.

Other objects, features, and advantages will be apparent to persons of ordinary skill in the art from the following detailed description of the disclosure and the accompanying drawings.

DESCRIPTION OF THE DRAWINGS

For a more complete understanding of the present disclosure, needs satisfied thereby, and the objects, features, and advantages thereof, reference now is made to the following descriptions taken in connection with the accompanying drawing.

FIG. 12 is a flowchart depicting an example transmission process in the variation of the illustrative embodiment according to one or more aspects of the disclosure.

FIG. 13 is a flowchart depicting an example printing process in the variation of the illustrative embodiment according to one or more aspects of the disclosure.

DETAILED DESCRIPTION

An illustrative embodiment in which an image forming system according to the aspects of the disclosure is implemented is now described in detail with reference to the accompanying drawings, like numerals being used for like corresponding parts in the various drawings. In the illustrative embodiment, the aspects of the disclosure may be applied to an image forming system comprising a multifunction peripheral ("MFP") having a printing function and a mobile device configured to generate print data to be printed by the MFP.

Figure 1:
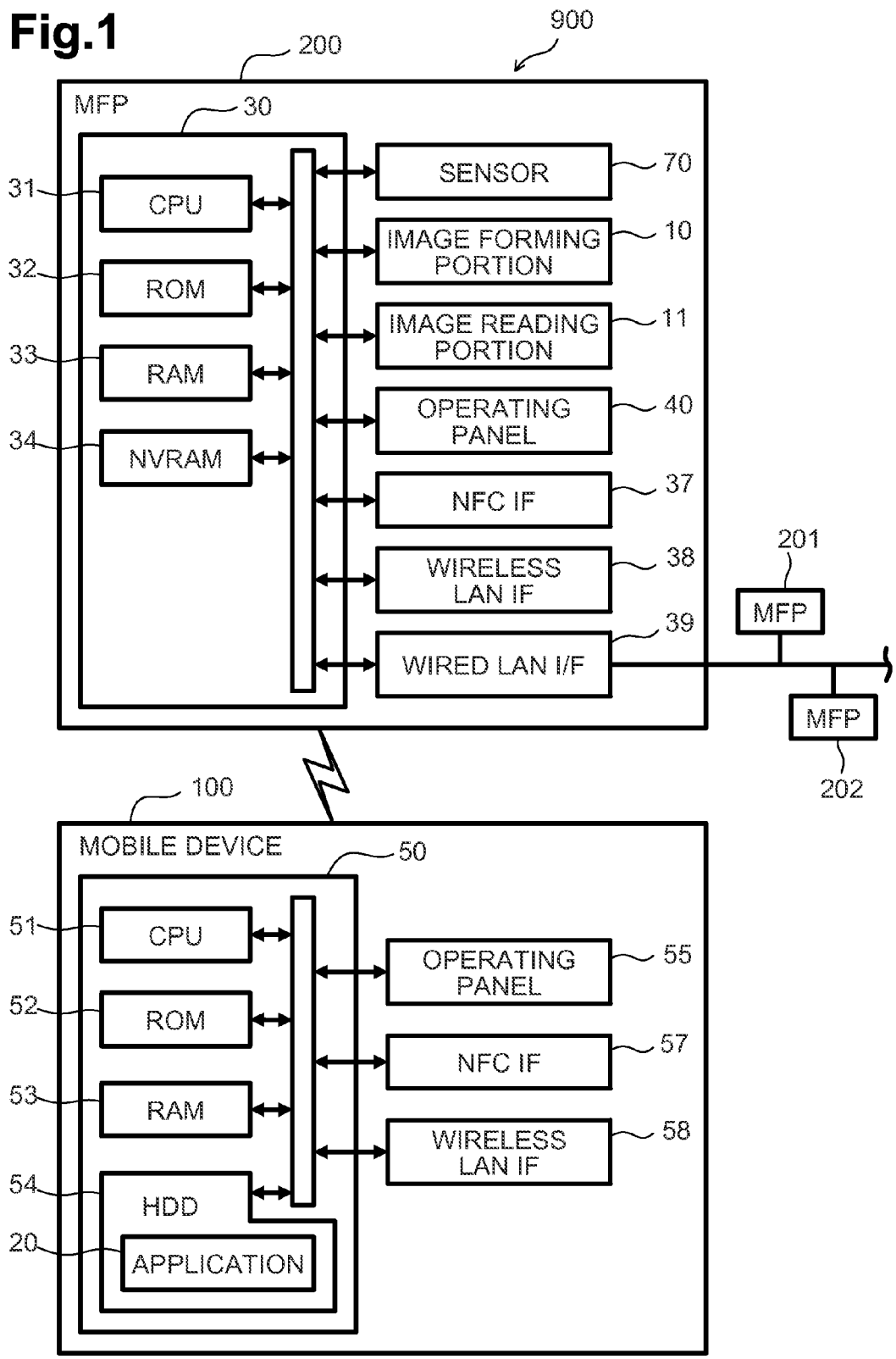
FIG. 1 is a block diagram depicting an example configuration of an image processing system in an illustrative embodiment according to one or more aspects of the disclosure.

As depicted in FIG. 1, an image forming system 900 according to the illustrative embodiment may comprise a mobile device 100 (an example of an information processing device) and MFPs 200, 201, 202 (an example of an image forming apparatus). The mobile device 100 may be configured to output print data to a specified MFP, such as one of the MFPs 200, 201, 202. Each MFP 200, 201, 202 may have a printing function and an image reading function. In the image forming system 900, data communication, e.g., transmission or reception of data, may be available among the mobile device 100 and the MFPs 200, 201, 202 via wireless communication. Further, the MFPs 200, 201, 202 may be also allowed to transmit or receive data thereamong via wired communication. Hereinafter, an explanation is given by taking the MFP 200 as an example. The other MFPs 201, 202 may have the same configuration as the MFP 200.

The MFP 200 may be configured to perform one of color printing and monochrome printing. In the illustrative embodiment, the MFP 200 may be allowed to perform the color printing. Further, the MFP 200 may be configured to perform printing by using one of an electrophotographic method and an inkjet method. Moreover, the MFP 200 may be configured to perform one of color scanning and a monochrome scanning. In the illustrative embodiment, the MFP 200 may be allowed to perform the color scanning. A scanning mechanism equipped in the MFP 200 may adopt one of a charge-coupled device ("CCD") and a Contact Image Sensor ("CIS").

In other embodiments, for example, one or more servers or access points may be connected to the image forming system 900 and communication may be performed between the mobile device 100 and the MFP 200 via the one or more servers or access points.

Next, a general configuration of the MFP 200 is described with reference to FIG. 1. The MFP 200 may comprise a control device 30 such as a central processing unit ("CPU") 31, a read-only memory ("ROM") 32, a random-access memory ("RAM") 33, and a nonvolatile random-access memory ("NVRAM") 34. The MFP 200 may further comprise an image forming portion 10, an image reading portion 11, an operating panel 40, a Near Field Communication ("NFC") interface 37 (an example of a short-range communication portion), a wireless local-area network ("LAN") interface 38 (an example of a long-range communication portion), a wired LAN interface 38, and a sensor 70, with which the control device 30 may be electrically connected. The image forming portion 10 may be configured to print an image onto a sheet. The image reading portion 11 may be configured to read an image from a document. The operating panel 40 may be configured to display operating statuses and to accept a user's input operation.

The ROM 32 may be configured to store various settings and firmware such as various control programs for controlling the MFP 200, as well as certain initial values. The RAM 33 and the NVRAM 34 may be used as workspaces, respectively, for temporarily storing the control programs read from the ROM 32 or as storage areas, respectively, for temporarily storing data.

The CPU 31 may store processing results in the RAM 33 or the NVRAM 34, in response to executing various programs read from the ROM 32 and/or and programs read from NVRAM 34, and signals sent from the sensor 70.

The NFC interface 37 may allow the MFP 200 to perform wireless communication using an NFC system in compliance with the International standards, e.g., ISO/IEC 21481 and ISO/IEC 18092. The MFP 200 may be configured to transmit or receive data, via the NFC interface 37, to or from an external device.

The wireless LAN interface 38 may allow the MFP 200 to perform wireless communication using a Wi-Fi Direct system (hereinafter, referred to as a "WFD system") in compliance with the standard IEEE 802.11 and its family standards (e.g., IEEE 802.11a, 802.11b, 802.11g, 802.11n). A communication method (i.e., the standards for wireless communication) may be different between the NFC system and the WFD system. For example, the communication method of the WFD system may have a longer communication range and a higher communication speed than the communication method of the communication range and speed of the NFC system. The MFP 200 may be configured to transmit or receive data, via the wireless LAN interface 38, to or from an external device.

In the WFD system, a network may be configured between a device that may serve as a group owner and manage the network (hereinafter, referred to as a "group-owner-status device") and a device that may serve as a client (hereinafter, referred to as a "client-status device"). The WFD system may be a communication method that may allow transmission and reception of data between the group-owner-status device and the client-status device in the network. Therefore, in order for the MFP 200 to perform data communication with an external device via the wireless LAN interface 38, the MFP 200 may need to configure a WFD network with the external device by establishing wireless communication with the external device.

In the illustrative embodiment, the MFP 200 may serve as the group owner and the mobile device 100 may serve as the client when the WFD network is configured. Not only the mobile device 100 but also the other devices may be allowed to belong in the WFD network, for example, as the client-status device. The MFP 200 may be configured to store identifying information of the client-status device and WFD connection information for establishing wireless communication using the WFD system with the client-status device. The WFD connection information may comprise, for example, a service set identifier ("SSID") that may be an identifier for identifying a WFD network, and a password.

The wired LAN interface 38 may allow the MFP 200 to transmit or receive data to or from the external device. The MFP 200 may be connected with the MFPs 201, 202 via the wired LAN interface 38.

The sensor 70 may be configured to detect an error occurring in the MFP 200 and output a detection signal to announce the occurrence of the error to the CPU 31. The error may be one of, for example, a paper jam, a toner shortage, and insufficient free space in the RAM 33.

Figure 2:
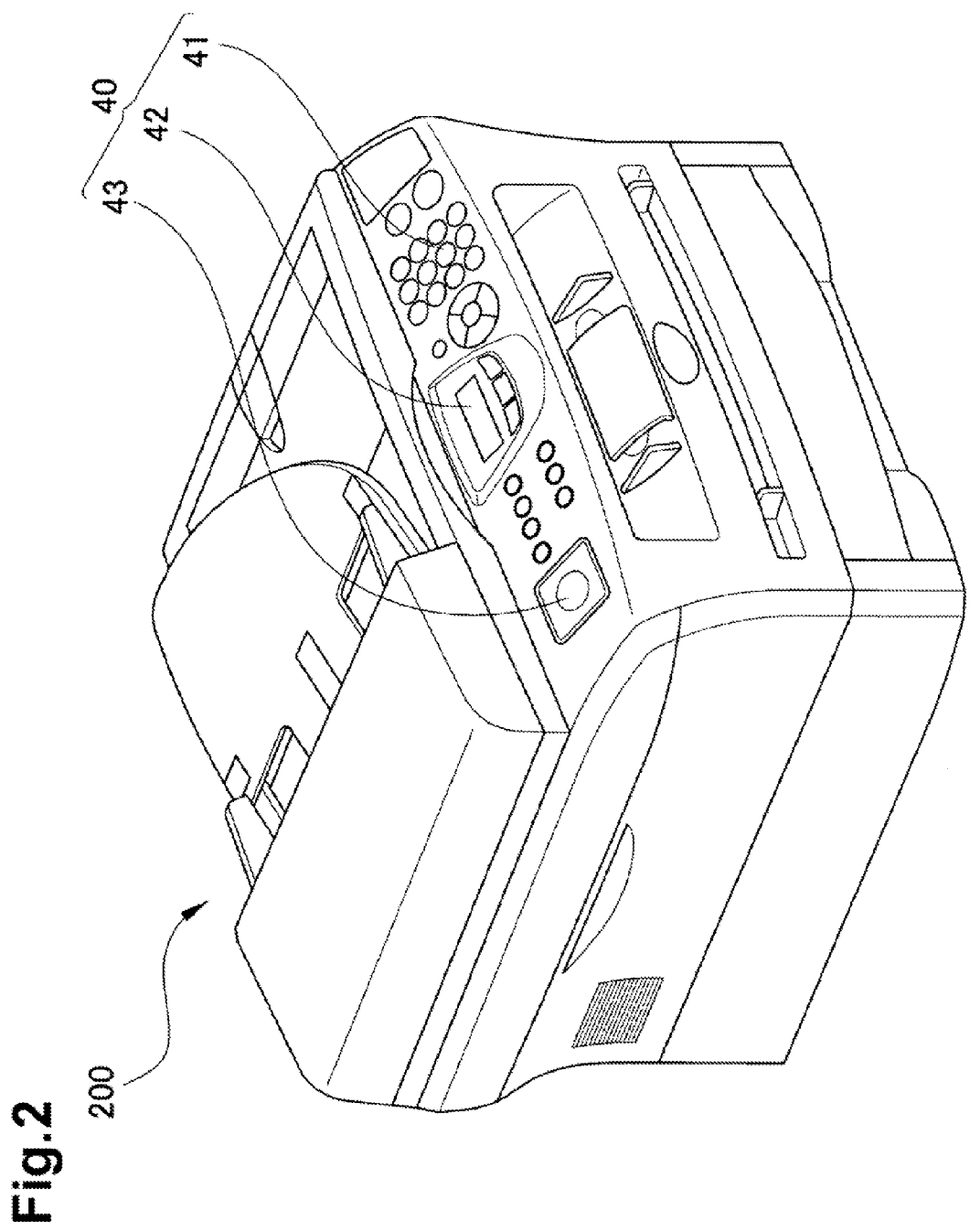
FIG. 2 is a perspective view depicting a multifunction peripheral ("MFP") in the illustrative embodiment according to one or more aspects of the disclosure.

As depicted in FIG. 2, the operating panel 40 may comprise an input portion 41 and a display portion 42. The input portion 41 may comprise various keys and buttons for accepting an user's input. The display portion 42 may be configured to display various messages and details of settings. The various keys and buttons may comprise, for example, an OK button for instructing a start of formation of an image and a cancel button for instructing a cancel of formation of an image.

The operating panel 40 may further comprise an NFC reader 43 for performing communication using the NFC system. The NFC reader 43 may comprise the NFC interface 37. While the power of the MFP 200 is on, the MFP 200 may be in a state of readiness to detect a device that may be able to perform wireless communication using the NFC system (hereinafter, referred to as an "NFC-enabled device"), by using signals issued from the NFC interface 37. Therefore, for example, when the user holds the mobile device 100 over the NFC reader 43, the MFP 200 may detect the mobile device 100 and thus communication using the NFC system may become available between the mobile device 100 and the MFP 200. To hold the mobile device 100 over the NFC reader 43 may be to locate the mobile device 100 within a communicable range of the NFC interface 37, and it may be unnecessary for the mobile device 100 and the NFC reader 43 to be in contact with each other.

The MFPs 201, 202 may have the same configuration as the MFP 200. Nevertheless, the MFPs 201, 202 may not necessarily comprise the NFC interface 37.

A general configuration of the mobile device 100 is now described with reference to FIG. 1. The mobile device 100 may comprise a control device 50 (an example of a control device) that may comprise a CPU 51, a ROM 52, a RAM 53, and a hard disk drive ("HDD") 54. The mobile device 100 may further comprise a touch-sensitive operating panel 55 (an example of a detector), an NFC interface 57 (an example of a short-range communication portion), and a wireless LAN interface 58 (an example of a long-range communication portion), which may be controlled by the control device 50. The operating panel 55 may have a display function and an input function. The NFC interface 57 may be a communication interface that may allow the mobile device 100 to perform communication with the external device.

The HDD 54 of the mobile device 100 may store an operating system ("OS"), browsers for browsing files on the Internet, and device drivers for controlling various devices. The HDD 54 may also store an application program (hereinafter, referred to as an "application 20") for generating print data to be printed by a printer based on data stored in the mobile device 100.

More specifically, the application 20 may generate print data based on print target data selected by the user. Then, the application 20 may place a print job for allowing a specified printer to print the print data, in a job queue of the mobile device 100. The generation of the print data may be performed by a printer driver installed in the application 20. However, in some examples where the mobile device 100 is configured such that the printer driver is allowed to be installed on the mobile device 100 independently of the application 20, the generation of the print data may be performed by the independent printer driver.

When communication using the WFD system is established between the mobile device 100 and the MFP 200 while the print job is placed in the job queue, the mobile device 100 may transmit the print job placed in the job queue to the MFP 200. Upon receipt of the print job, the MFP 200 may perform printing of the print data. A procedure for establishing the communication using the WFD system between the mobile device 100 and the MFP 200 and a procedure for transmitting a print job are further described later.

The CPU 51 may store processing results in the RAM 53 or the HDD 54, in response to executing various control programs read from the ROM 52 and/or the programs read from the HDD 54. The operations of the application 20 may also be processed by the CPU 51.

Similar to the NFC interface 37 of the MFP 200, the NFC interface 57 may allow the mobile device 100 to perform wireless communication using the NFC system. Similar to the wireless LAN interface 38 of the MFP 200, the wireless LAN interface 58 may allow the mobile device 100 to perform wireless communication using the WFD system. The mobile device 100 may be configured to transmit or receive data to or from the external device via one of the NFC interface 57 and the wireless LAN interface 58.

The application 20 installed on the mobile device 100 is now described with reference to FIGS. 3 and 4. Upon receipt of an instruction to start the application 20 from the user, the mobile device 100 may start the application 20.

Then, the application 20 may display an initial screen, e.g., a data selection screen for allowing the user to select print target data, on the operating panel 55, and determine the print target data in accordance with the user's selection. For the data selection, the application 20 may display, on the operating panel 55, one or more data names or thumbnail images of data stored in the mobile device 100. Then, the user may touch or otherwise select a data name or a thumbnail image of desired data on the operating panel 55. Thus, the print target data may be selected.

Figure 3:
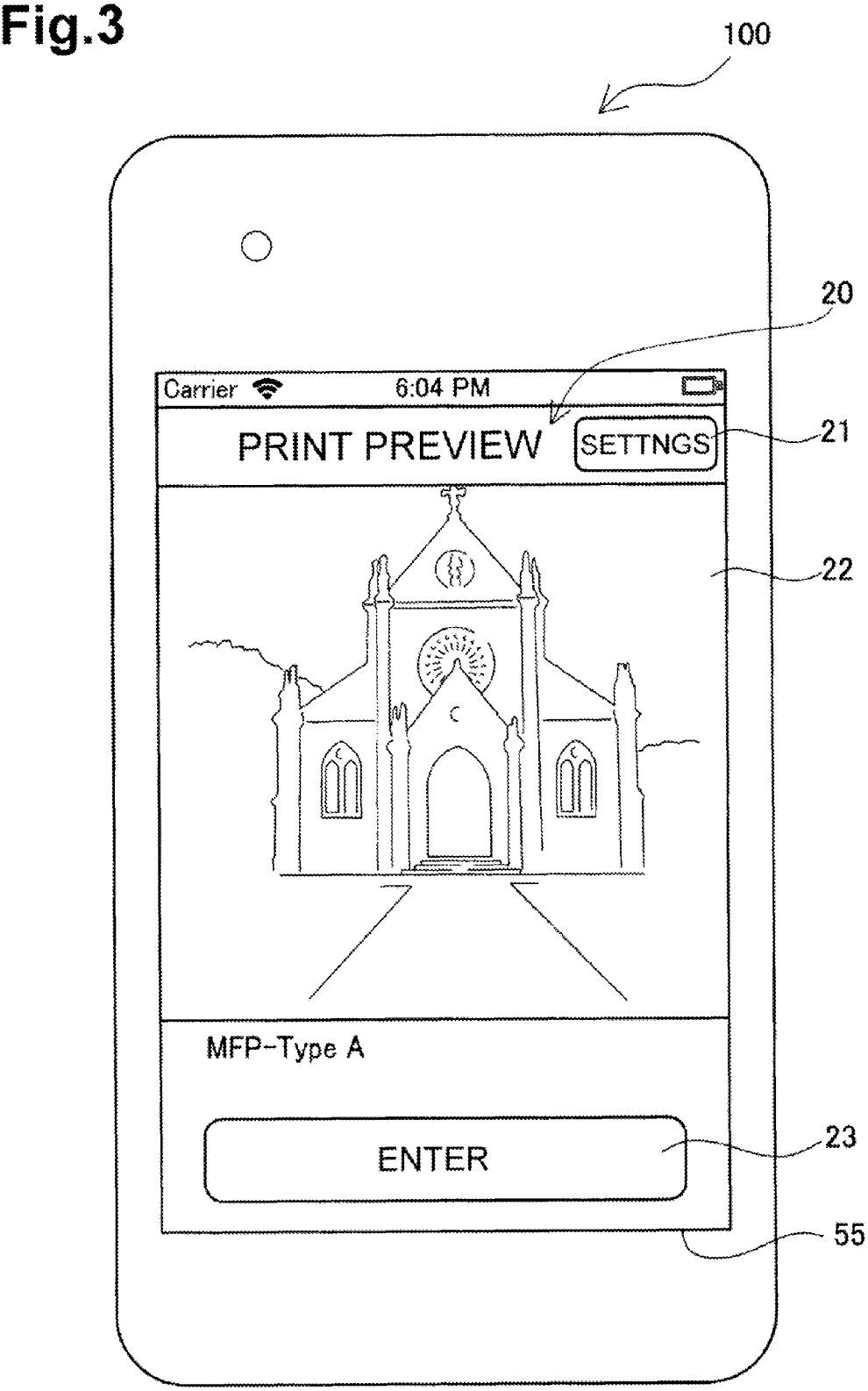
FIG. 3 depicts an example print preview screen of a print application running on a mobile device in the illustrative embodiment according to one or more aspects of the disclosure, wherein the print preview screen is used to accept a print execution instruction.

When the print target data is selected, the application 20 may display a print preview screen on the operating panel 55, as depicted in FIG. 3. The print preview screen displayed on the operating panel 55 may comprise a virtual "SETTINGS" button 21, a preview area 22, and a virtual "ENTER" button 23. The virtual "SETTINGS" button 21 may be used to access a print setting screen. The preview area 22 may display a print preview image of the selected print target data. The virtual "ENTER" button 23 may be used to place a print job in a job queue. The user may be allowed to preview a print preview image of the print target data displayed on the preview area 22 so that the user may confirm that the print image is desirable before printing.

Figure 4:
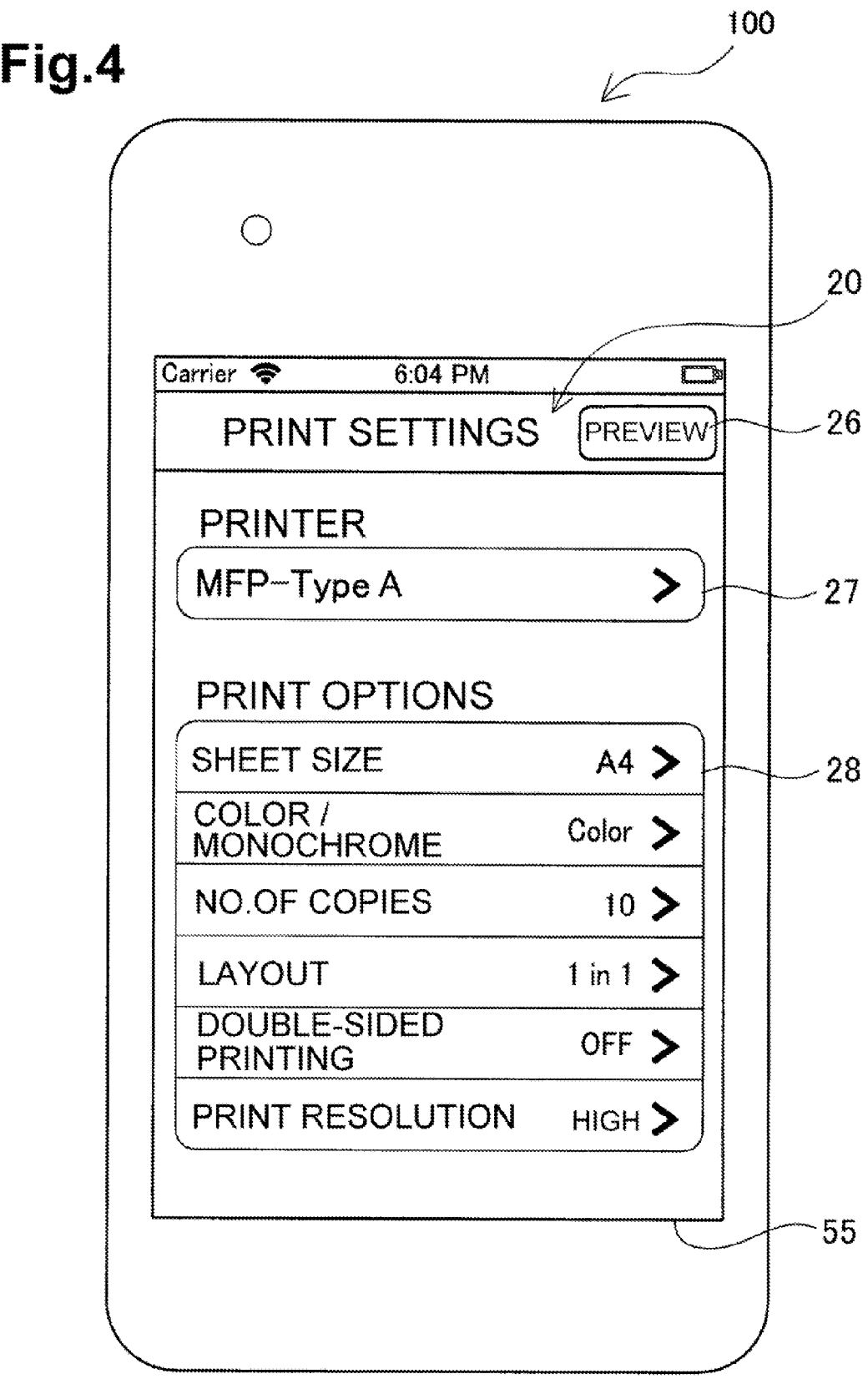
FIG. 4 depicts an example print setting screen of the print application running on the mobile device in the illustrative embodiment according to one or more aspects of the disclosure, wherein the print setting screen is used to accept a change in print settings.

When the virtual "SETTINGS" button 21 is touched or otherwise selected by the user, the application 20 may display a print setting screen on the operating panel 55, as depicted in FIG. 4. The print setting screen displayed on the operating panel 55 may comprise a virtual "PREVIEW" button 26, a printer specifying area 27, and an option specifying area 28. The virtual "PREVIEW" button 26 may be used to access the print preview screen depicted in FIG. 3. The printer specifying area 27 may be used to specify a printer to be used. The option specifying area 28 may be used to specify one or more print options. When the printer specifying area 27 is touched or otherwise selected by the user, the printer specifying area 27 may list available printers on the operating panel 55 and may allow the user to change a currently-selected printer to another printer to be used for printing. Similarly, when the option specifying area 28 is touched/selected by the user on the operating panel 55, the option specifying area 28 may allow the user to change one or more currently-selected printer options to another printer options.

After completing the selection of the print target data and the specification of the print settings, the user may touch/select the virtual "ENTER" button 23 on the print preview screen. Then, the application 20 may generate print data reflecting the printer settings specified on the print setting screen and place a print job for allowing the specified printer, e.g., the MFP 200, to print the print data in the job queue of the mobile device 100 when the virtual "ENTER" button 23 is touched/selected by the user on the print preview screen. Thus, the mobile device 100 may become in a state of readiness to pass the print job to the MFP 200. A procedure for transmitting a print job placed in the job queue to the MFP 200 is further described later.

Figure 5:
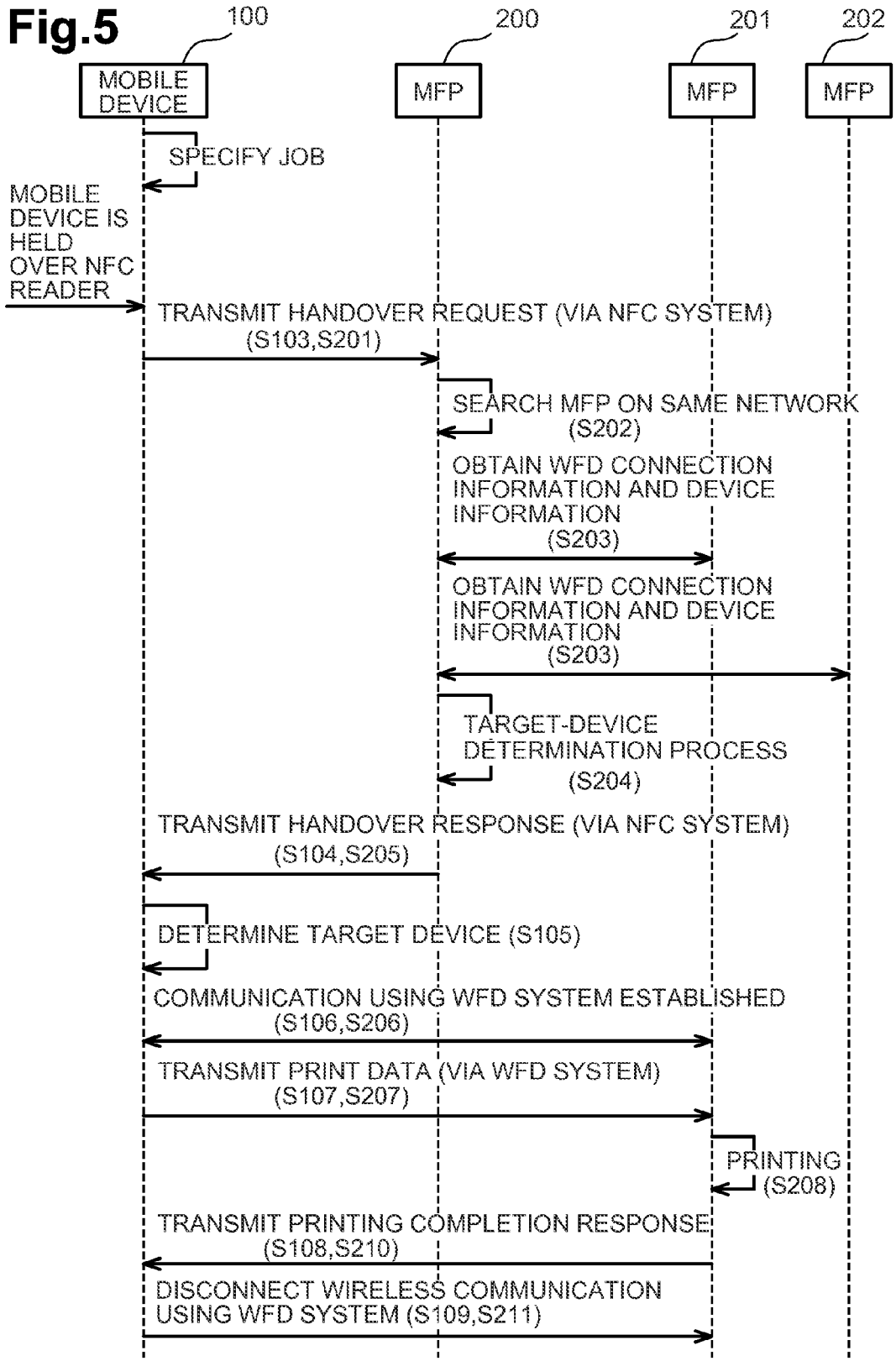
FIG. 5 is a sequence diagram depicting operations performed by each of the mobile device and MFPs in data communication in the illustrative embodiment according to one or more aspects of the disclosure.

An outline of operations from the transmission of a print job from the mobile device 100 to the MFP 200 to the execution of the print job by the MFP 200 in the image processing system 900 is now described with reference to FIG. 5. Step numbers shown in a sequence diagram of FIG. 5 correspond to step numbers shown in flowcharts of FIGS. 6, 7, 8, and 10.

First, the user may determine print data to be printed via the application 20 and enter a print job for the print data in the mobile device 100. Then, in this state, the user may hold the mobile device 100 over the NFC reader 43 of the MFP 200. By doing so, the MFP 200 may detect the mobile device 100. Thus, wireless communication using the NFC system may be established and performed between the mobile device 100 and the MFP 200, and a handover request may be transmitted by the mobile device 100 (step S103) and received by the MFP 200 (step S201). The handover request may be transmitted using the NFC system.

The mobile device 100 may preferably transmit job identifying information together with the handover request. The job identifying information may be information for identifying the print settings of the print job, and may comprise, for example, a user name, color information, print resolution, data format, data compression method, number of copies, print layout, double-sided printing information, and number of pages included in print data. The job identifying information may further comprise, for example, a group name as necessary. In the illustrative embodiment, the MFP 200 may have the reading function as well as the printing function. Therefore, the job identifying information may further comprise function identifying information.

The MFP 200 that received the handover request may then search one or more printers, e.g., the MFPs 201, 202, that may be connected to the same network as the MFP 200 via the wired LAN interface 38 (step S202). After that, the MFP 200 may obtain WFD connection information and device information of the MFPs 201, 202 (step S203). More specifically, the MFP 200 may request a transmission of WFD connection information and device information from the MFPs 201, 202, respectively, that may be connected to the same network. In response to the request from the MFP 200, the MFPs 201, 202 may read out their own WFD connection information and device information from the storage area, e.g., the NVRAM 34, respectively, and transmit the read WFD connection information and device information to the MFP 200. Then, the MFP 200 may obtain the WFD connection information and the device information of the MFPs 201, 202, based on the responses from the MFPs 201, 202, respectively.

The device information may comprise error information, performance information, and communication availability information. The error information may represent the presence or absence of an error, such as a paper jam or a toner shortage. The performance information may represent whether the device is able to perform, for example, color printing or double-sided printing. The communication availability information may represent whether the device allows access from the mobile device 100, e.g., whether access limitation is imposed for security reasons.

Then, the MFP 200 may perform a target-device determination process (step S204). In the target-device determination process, the MFP 200 may determine one or more MFPs that may be available to print the print job, based on the device information of the MFPs 201, 202 obtained in step S203 and the job identifying information obtained in steps S103 and S201.

Once the MFP 200 determines the one or more MFPs that are available to print the print job, the MFP 200 may transmit WFD connection information to the mobile device 100 (step S104) and the mobile device 100 may receive the WFD connection information (step S205). The WFD connection information may be used for changing the NFC connection to the WFD connection. The WFD connection information transmitted in step S104 may comprise the WFD connection information of the MFP 200 and the WFD connection information, which has been obtained by the MFP 200 in step S203, of the MFPs 201, 202 that may be connected to the same network. At that time, in other embodiments, the MFP 200 may transmit only the WFD connection information of the one or more available MFPs determined in step S204. Further, the MFP 200 may transmit the device information obtained in step S203 as well as the WFD connection information of the one or more available MFPs.

In the mobile device 100 that received the WFD connection information, one or more target devices for WFD connection may be displayed on the operating panel 55 based on the received WFD connection information. Then, the user may input a selection instruction of a target device for WFD connection through the operating panel 55. In FIG. 5, the user may specify the MFP 201 as the target device.

Then, wireless communication using the WFD system may be established between the mobile device 100 and the specified target device by using the WFD connection information transmitted in S205 or received in step S104, respectively (steps S106 and S206). That is, a handover of the communication method from the NFC system to the WFD system may be implemented, and thus, the communication method for data communication may be changed.

After the wireless communication using the WFD system is established between the mobile device 100 and the MFP 201, the mobile device 100 may transmit the print data to the MFP 201 via wireless communication using the WFD system (steps S107 and S207). Upon receipt of the print data, the MFP 201 may print the print data (step S208). After completing the printing of all pages of the print data, the MFP 201 may transmit a printing completion response to the mobile device 100 (steps S108 and S210). The printing completion response may be transmitted via wireless communication using the WFD system. Upon receipt of the printing completion response from the MFP 201, the mobile device 100 may disconnect the MFP 200 from the WFD connection (steps S109 and S211). Thus, a series of operations may be completed successfully.

Next, the processes performed by each device that may implement the operations of the above-described image forming system are described. First, a print request process performed by the mobile device 100 is described with reference to a flowchart in FIG. 6. The print request process may be performed by the CPU 51 when the CPU 51 detects the entry of a print job in the job queue performed by the touching/selection of the virtual "ENTER" button 23 of the application 20 by the user.

In the print request process, in step S101, the CPU 51 may generate information to be transmitted in wireless communication using the NFC system. The information generated in step S101 may be the job identifying information for identifying the print settings of the print job. After step S101, the routine may move to step S102.

In step S102, the CPU 51 may determine whether an MFP with which the mobile device 100 performs communication using the NFC system has been detected (step S102). In the illustrative embodiment, the CPU 51 may receive a connection confirmation transmitted from the MFP 200 by which the user may hold the mobile device 100 over the NFC reader 43 of the MFP 200. When the mobile device 100 receives the connection confirmation, the CPU 51 may determine that the MFP has been detected. Hereinafter, it may be assumed that the MFP detected in step S102 is the MFP 200.

When the MFP has not been detected (NO in step S102), the routine may repeat step S102. When the MFP has been detected (YES in step S102), the routine may move to step S103. In step S103, the CPU 51 may transmit a handover request to the MFP 200 detected in step S102, via the NFC interface 57 (step S103). The handover request may comprise handover information necessary to change the currently-used communication method to the WFD system and the job identifying information generated in step S101.

After step S103, the CPU 51 may receive a response to the handover request (hereinafter, referred to as a "handover response") from the MFP 200 that may be a receiver of the handover request (step S104). The handover response may comprise WFD connection information and the device information of one or more MFPs other than the MFP 200. Then, the mobile device 100 may display the one or more MFPs whose WFD connection information has been received, on the printer specifying area 27 of the operating panel 55.

After step S104, the routine may move to step S105. In step S105, the CPU 51 may determine a target device for a WFD connection. The CPU 51 may determine the target device from the one or more MFPs displayed on the printer specifying area 27 of the operating panel 55, based on the user's input instruction. In other embodiments, for example, the CPU 51 may automatically determine a target device, e.g., the MFP 200 with which the mobile device 100 performed the communication using the NFC system, without the need to require a user's input instruction. The CPU 51 may automatically determine one of the one or more MFPs that may be available to print the print job, as the target device, based on the job identifying information received in step S104, without the need for user input or instruction. After step S105, the routine may move to step S110. In step S110, the CPU 51 may perform a transmission process and then end the print request process.

Figure 7:
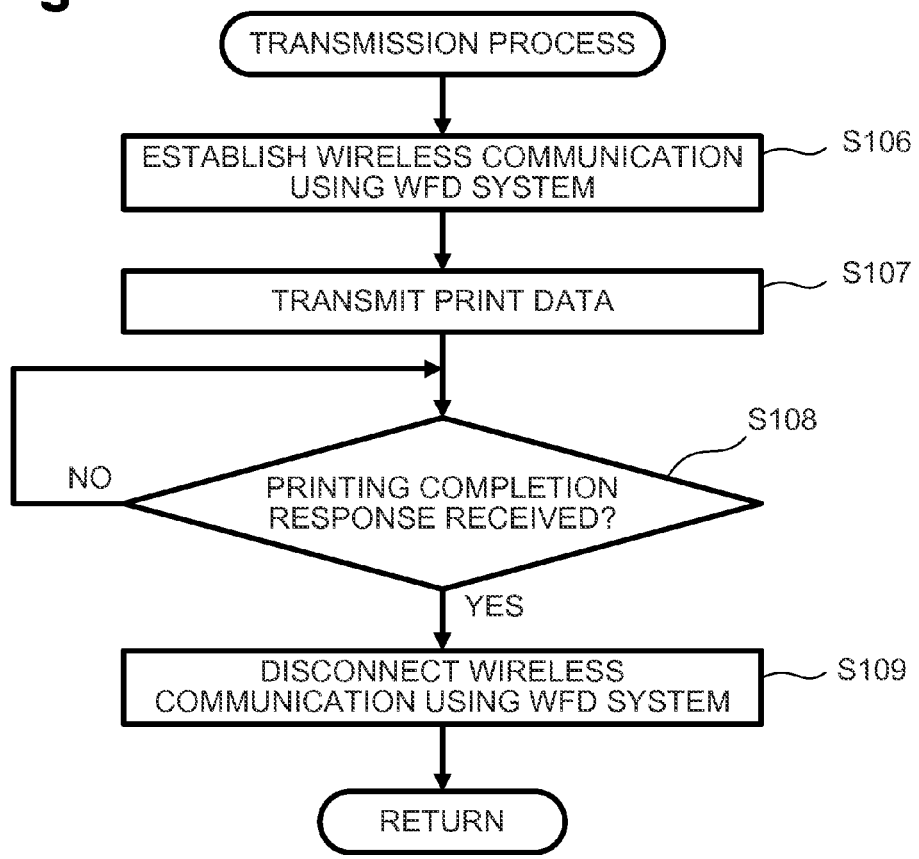
FIG. 7 is a flowchart depicting an example transmission process in the illustrative embodiment according to one or more aspects of the disclosure.

The transmission process is now described with reference to FIG. 7. In step S106, the CPU 51 may transmit connection confirmation to the MFP 200 that may be the target device determined in step S105 and establish wireless communication using the WFD system with the MFP 200 by using the WFD connection information received in step S104. For example, the handover from the NFC system to the WFD system may be implemented. After the wireless communication using the WFD system is established, in step S107, the CPU 51 may transmit the print data of the print job placed in the job queue to the MFP 200 via wireless communication using the WFD system, and then the routine may move to step S108.

In step S108, the CPU 51 may determine whether a printing completion response has been received. While the printing completion response is not received (NO in step S108), the routine may repeat step S108. When the printing completion response has been received (YES in step S108), in step S109, the CPU 51 may transmit disconnection confirmation to the MFP 200 and disconnect the wireless communication using the WFD system between the mobile terminal 100 and the MFP 200. Then, the routine may move back to the print request process and the CPU 51 may end the print request process.

Figure 8:
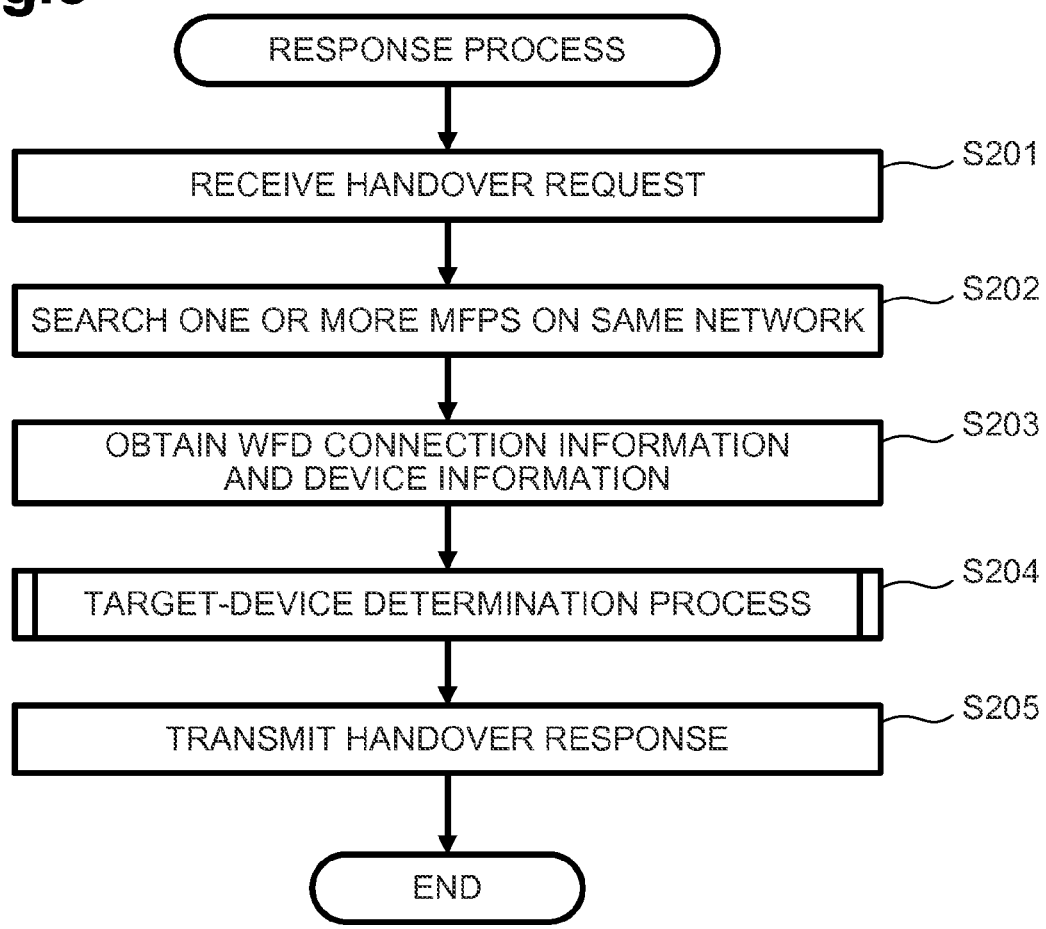
FIG. 8 is a flowchart depicting an example response process in the illustrative embodiment according to one or more aspects of the disclosure.

A response process performed by the MFP 200 is now described with reference to FIG. 8. The response process may be performed by the CPU 31 when the NFC interface 37 detects an NFC-enabled device.

In the response process, in step S201, the CPU 31 may receive the handover request from the mobile device 100. The received handover request may correspond to the handover request transmitted in step S103 and thus comprise information such as the job identifying information.

Then, in the MFP 200 that received the handover request from the mobile device 100, in step S202, the CPU 31 may search one or more MFPs that may be connected to the same network. The one or more MFPs that may be present on the same network may be one or more MFPs that may be connected with the MFP 200 via the wired LAN interface 38. In step S203, the MFP 200 may obtain the WFD connection information and the device information of the MFPs 201, 202. As described above, the device information may comprise the error information, the performance information, and the communication availability information.

After obtaining the device information, in step S204, the CPU 31 may perform a target-device determination process. The target-device determination process is now described with reference to FIG. 9. In the illustrative embodiment, the target-device determination process in FIG. 9 may be performed after step S203. Nevertheless, in other embodiments, for example, the target-device determination process in FIG. 9 may be performed independent of the response process in FIG. 8. In this case, the target-device determination process in FIG. 9 may be performed by the CPU 31 at a predetermined timing.

First, in step S301, the CPU 31 may record the one or more MFPs that may be connected to the same network as the MFP 200, in an available MFP list in which one or more MFPs with which the mobile device 100 can connect may be listed. The one or more MFPs that may be connected to the same network may comprise the one or more MFPs found in step S202, for example, the MFPs 201, 202.

In step S302, the CPU 31 may determine with respect to one of the one or more MFPs recorded in the available MFP list whether the MFP is able to perform communication using the WFD system with the mobile device 100. The CPU 31 may determine that the MFP is not able to perform communication using the WFD system with the mobile device 100, when, for example, the MFP is not allowed to perform communication with the mobile device 100 because of the access limitation imposed for security reasons. The CPU 31 may also determine that the MFP is not able to perform communication using the WFD system with the mobile device 100 when the wireless LAN interface 38 is not in a state of readiness to perform communication because of being in process of printing the other print job.

When the CPU 31 determines that the MFP is not able to perform communication (NO in step S302), the routine may move to step S303. In step S303, the CPU 31 may delete the MFP that may be not able to perform communication, from the available MFP list. Alternatively, in step S303, the applicable MFP may not necessarily be deleted from the available MFP list. Information representing that the applicable MFP is unavailable may be added to the applicable MFP in the available MFP list without deleting the applicable MFP therefrom.

When the CPU 31 determines that the MFP is able to perform communication (YES in step S302) or after step S303, the routine may move to step S304. In step S304, the CPU 31 may determine, based on a total number of pages to be printed for the print data obtained from the job identifying information received in step S201, whether an estimated combined total of the total number of pages to be printed for the print data and the total number of pages actually printed (a current total page count) is less than or equal to a maximum page count if a print job is executed. More specifically, the maximum page count may be a value specified by printer, user, or group. The current total page count and the maximum page count may be stored in the MFP 200 or the other device, such as the server.

When the estimated combined total exceeds the maximum page count (NO in step S304), in step S305, the CPU 31 may delete the applicable MFP from the available MFP list. In step S305, similar to the step S303, information representing that the estimated combined total exceeds the maximum page count may be added to the applicable MFP in the available MFP list without deleting the applicable MFP therefrom. When the estimated combined total is less than or equal to the maximum page count (YES in step S304) or after step S305, the routine may move to step S306.

In step S306, the CPU 31 may determine, based on the print settings obtained from the job identifying information, whether print specifications of the MFP are satisfactory for the print settings. For example, the CPU 31 may determine whether the MFP is able to perform the print options specified in the print-color setting, the print-resolution setting, and the double-sided printing setting, with its print specifications. When the CPU 31 determines that the print specifications of the MFP are not satisfactory for the print settings (NO in step S306), the CPU 31 may delete the applicable MFP from the available MFP list. Alternatively, in step S306, similar to steps S303 and S305, information representing that the print specifications of the MFP are not satisfactory for the print settings may be added to the applicable MFP in the available MFP list without deleting the applicable MFP therefrom.

When the CPU 31 determines that the print specifications of the MFP are satisfactory for the print settings (YES in step S306) or after step S307, the routine may move to step S308. In step S308, the CPU 31 may determine whether there is an MFP, on which the processing of one or more of steps S302, S304, and S306 have not been performed yet, included in the MFPs recorded in the available MFP list in step S301. When there is a yet-to-be determined/evaluated MFP in the available MFP list (YES in step S308), the routine may move to step S302 again and the CPU 31 may perform the processing of step S302 and subsequent steps on a next target MFP. When there is no yet-to-be determined/evaluated MFP in the available MFP list (NO in step S308), the routine may move back to the response process in FIG. 8.

Figure 9:
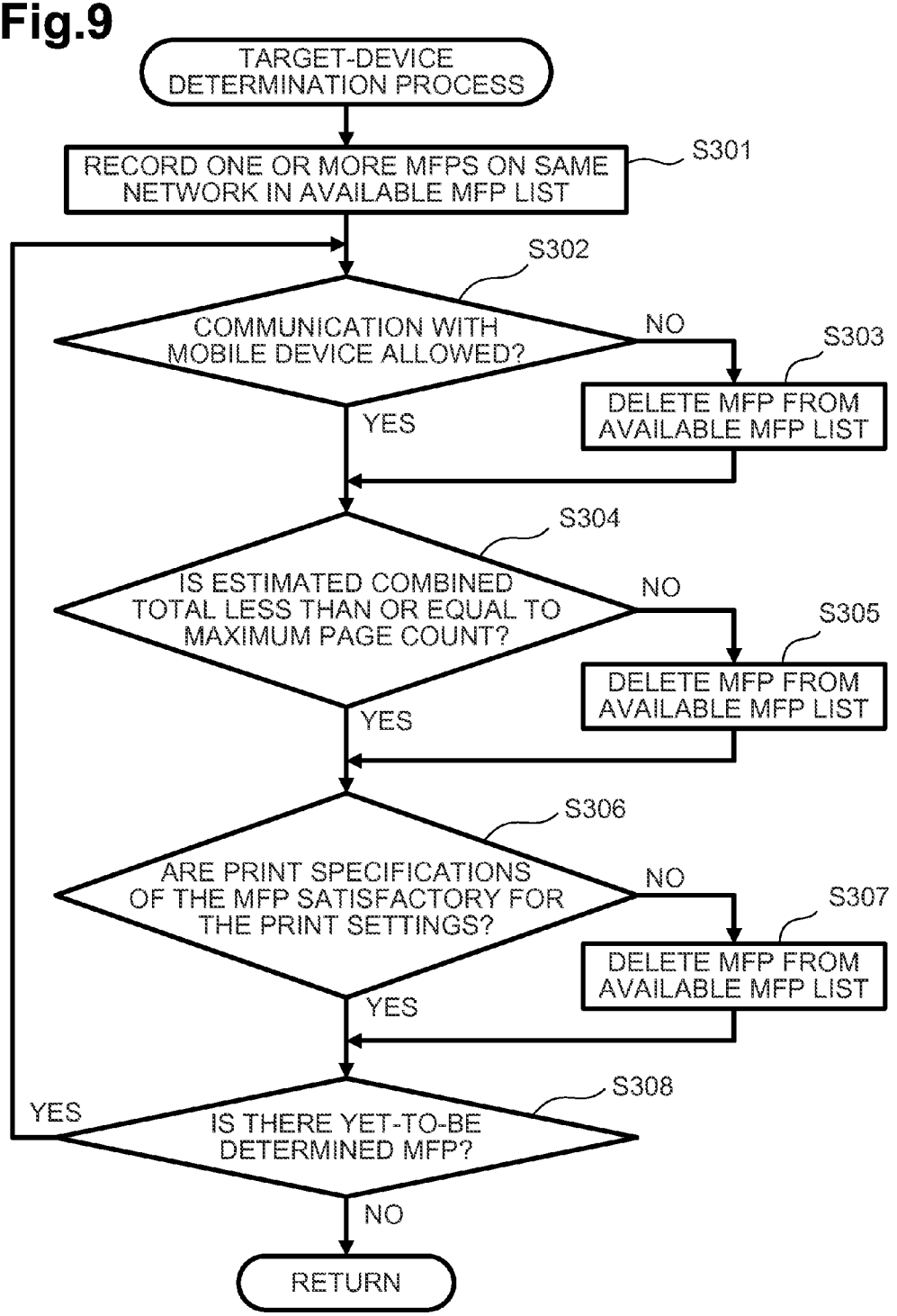
FIG. 9 is a flowchart depicting an example target-device determination process in the illustrative embodiment according to one or more aspects of the disclosure.

In other embodiments, for example, one or more or all of the determinations in steps S302, S304, and S306 in the target-device determination process in FIG. 9 may not be performed. For example, steps S302, S304 and/or S306 may be skipped. According to one or more arrangements, when the determination in step S302 is not performed, the routine may move to step S304 after step S301. Likewise, when the determination in step S304 is not performed, the routine may move to step S306 after step S302.

The response process is further described with reference to FIG. 8. In step S204, after the target-device determination process, the routine may move to step S205. In step S205, the CPU 31 may transmit a handover response, to which the availability of WFD connection determined in step S204 (i.e., the available MFP list) and the WFD connection information may be added, to the mobile device 100, via the NFC interface 37. In accordance with step S205, in step S105, the one or more available MFPs may be displayed on the operating panel 55 of the mobile device 100. As described above, in step S105, only the one or more MFPs that may be determined, in step S204, to be able to connect the mobile device 100 and print the print job, or all of the one or more MFPs on the same network, may be displayed on the operating panel 55 in conjunction with the information representing the availability of connection.

After step S205, the CPU 31 may end the response process.

Figure 10:
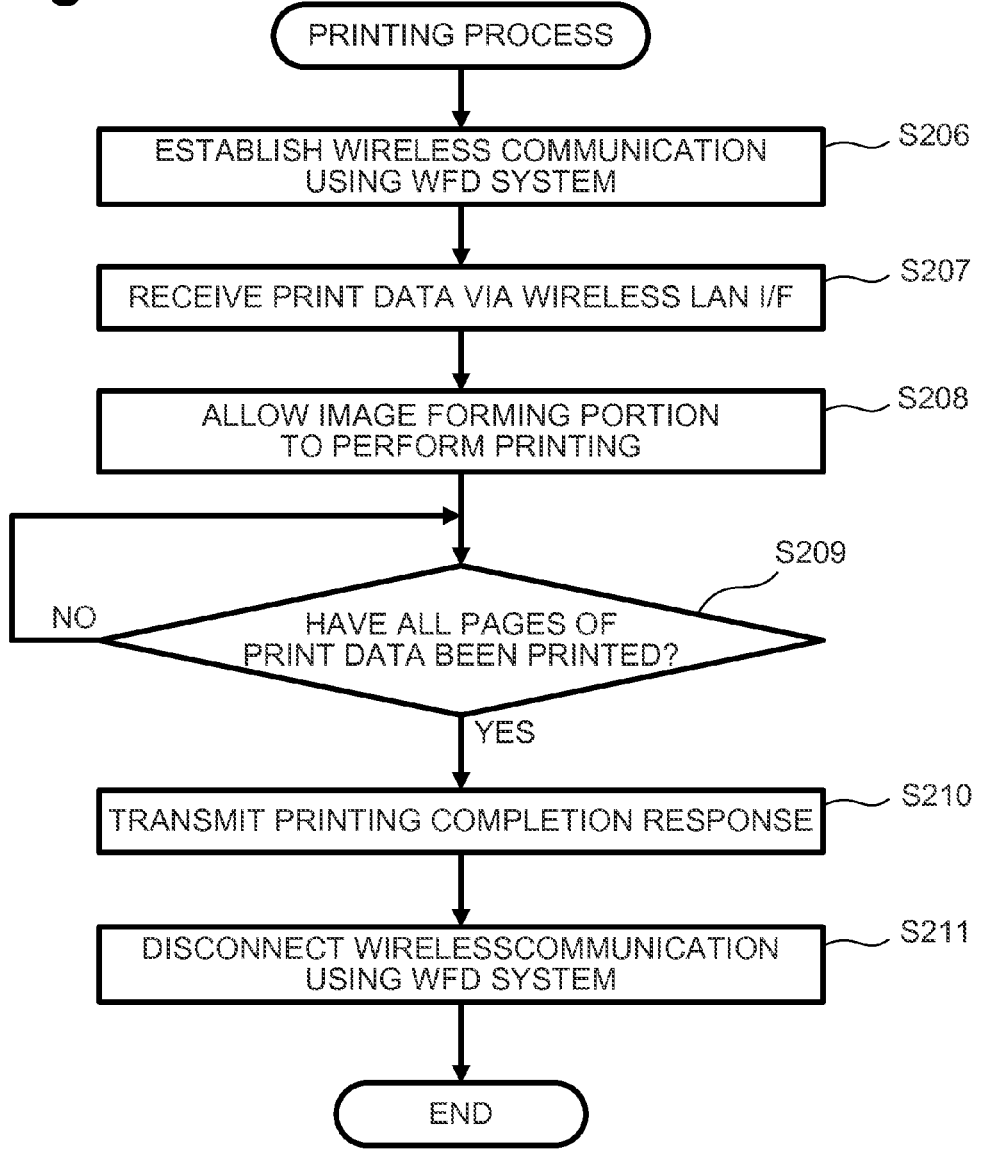
FIG. 10 is a flowchart depicting an example printing process in the illustrative embodiment according to one or more aspects of the disclosure.

A printing process is now described with reference to FIG. 10. The printing process may be performed when the CPU 31 detects the connection confirmation for the WFD connection transmitted from the mobile device 100 in step S106.

First, in step S206, the CPU 31 may establish wireless communication using the WFD system with the mobile device 100. For example, a handover from the NFC system to the WFD system may be implemented. After the wireless communication using the WFD system is established, the routine may move to step S207. In step S207, the CPU 31 may receive the print data, via the communication using the WFD system, from the mobile device 100. Upon receipt of the print data, in step S208, the CPU 31 may allow the image forming portion 10 to start printing of the print data. After the printing starts, in step S209, the CPU 31 may determine whether all pages included in the received print data have been printed. When all pages included in the received print data have not been printed yet (NO in step S209), the routine may repeat step S209. When all pages included in the received print data have been printed (YES in step S209), the routine may move to step S210.

In step S210, the CPU 31 may transmit a printing completion response to the mobile device 100. After step S210, in step S211, the mobile device 100 may disconnect the wireless communication using the WFD system established between the MFP and the mobile device 100 after receiving disconnection confirmation transmitted from the mobile device 100 in accordance with the processing of step S109. After step S211, the CPU 31 may end the printing process in FIG. 9.

In the illustrative embodiment, the description relates to when a print job is printed by the MFP 201. However, the print job may be printed in one of the MFPs 200, 202 and the process described in the illustrative embodiment may apply to MFPs 200, 202, when the user specifies one of the MFPs 200, 202 as the target device in step S105.

As described above, according to the illustrative embodiment, in the image forming system 900, the mobile device 100 and the MFP may be allowed to transmit or receive the WFD connection information of one or more other MFPs other than the MFP with which communication is performed with the mobile device 100 using the NFC system, and communication using the WFD system may be allowed to be established between the mobile device 100 and one of the one or more other MFPs. Further, the other MFP may be allowed to print the print job. Therefore, when the user requires printing of the print data, it may become unnecessary for the user to move to the location where the MFP to be used for printing the print job and communicate using the NFC system with that MFP. Accordingly, this configuration may increase user convenience.

Further, when one of the MFPs 201, 202 not comprising the NFC interface 37 is used, the handover of the communication method to the WFD system may be implemented between the mobile device 100 and one of the MFPs 201, 202 by using the NFC interface 37 of the MFP 200. Therefore, this configuration may increase user convenience.

In the illustrative embodiment, in the target-device determination process, the one or more MFPs that may be connected to the same network as the MFP that may perform the communication using the NFC system with the mobile device 100 may be recorded in the available MFP list. Further, the determinations may be performed as to whether the target MFP is allowed to connect the mobile device 100 (step S302), whether the estimated combined total is less than or equal to the maximum page count (step S304), and whether the print specifications of the target MFP are satisfactory for the print settings (step S306). Therefore, the user may appropriately select an MFP that may be able to connect the mobile device 100 and print the print data. Therefore, this configuration may also increase user convenience. Accordingly, this configuration may prevent or reduce an occurrence of a problem that the mobile device 100 may be unconnectable with any MFP or a problem that the target MFP may not be able to print the print data after the mobile device 100 is connected to the target MFP.

In the illustrative embodiment, when the MFP receives information, e.g., a handover request, from the mobile device 100 (step S201) after the wireless communication using the NFC system between the mobile device 100 and the target MFP is established, the MFP may obtain WFD connection information of the other MFPs (steps S202 and S203). Nevertheless, in other embodiments, for example, the MFP may be configured to obtain the WFD connection information of the other MFPs prior to the receipt of the handover request. In this case, the MFP may store, in the NVRAM 34, the WFD connection information that may be previously obtained or manually entered by the user. When the MFP receives the handover request transmitted from the mobile device 100, the MFP may transmit the WFD connection information stored in the NVRAM 34 to the mobile device 100.

With this configuration, when wireless communication using the NFC system is established, the MFP may transmit the WFD connection information of the other MFPs at once in response to the handover request. Thus, this configuration may allow the MFP to implement speedy processing and thus increase user convenience.

Hereinafter, a general outline of the operations of the image forming system according to a variation of the above-described illustrative embodiment. In the variation, when an error occurs during printing of a print job, the mobile device 100 may be configured to connect another MFP that may be different from the MFP currently used for the printing of the print job and the other MFP may take over the printing of the print job where the previous MFP left off. This series of operations is now described with reference to FIG. 11. An explanation is given mainly for the aspects different from the above-described illustrative embodiment, and an explanation is omitted for the common aspects by assigning the same reference numerals thereto. Step numbers shown in a sequence diagram of FIG. 11 correspond to step numbers shown in appropriate flowcharts.

In the variation, when an error does not occur during printing of the print job, the same operations may be performed as the operations performed in the above-described illustrative embodiment. Hereinafter, a case where an error occurs during printing of the print job is described below. Although omitted in FIG. 11, the steps performed until step 208 may be may be performed in the same manner as the steps performed in the illustrative embodiment as shown in FIG. 5.

Figure 11:
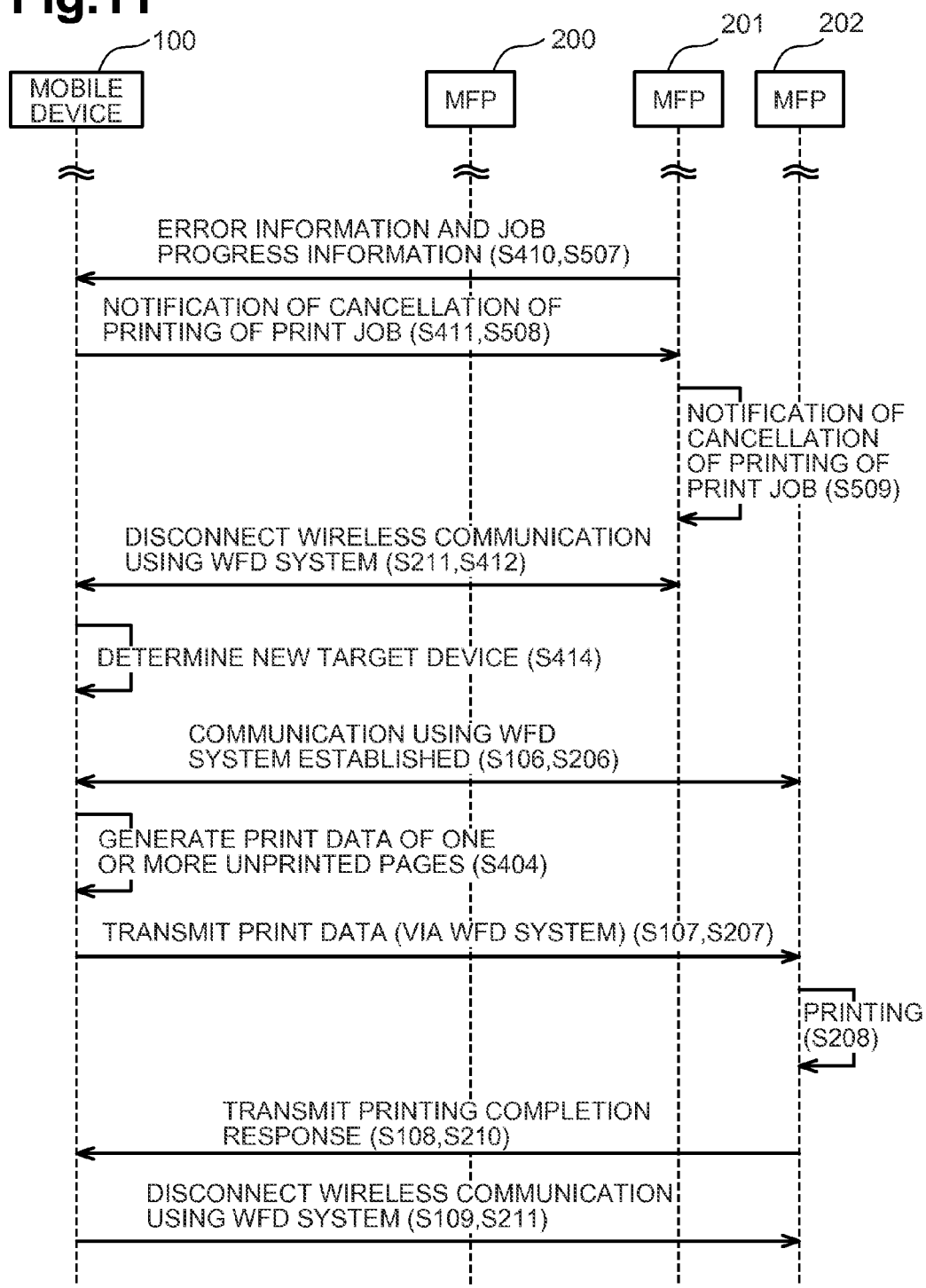
FIG. 11 is a sequence diagram depicting operations performed by each of the mobile device and the MFPs in data communication in a variation of the illustrative embodiment according to one or more aspects of the disclosure.

FIG. 11 illustrates an example case in which an error occurs during printing of a print job in the MFP 201 and the MFP 202 continues the printing of the print job.

When an error occurs in the MFP 201, the MFP 201 may provide error information to the mobile device 100. The mobile device 100 may also receive progress information representing progress of the print job as well as the error information from the MFP 201 (steps S410 and S507).

When the mobile device 100 receives the progress information of the print job, a job execution cancel instruction for the print job may be transmitted and received between the mobile device 100 and the MFP 201 (steps S411 and S508). Then, in accordance with the job execution cancel instruction received from the mobile device 100, the MFP 201 may cancel the execution of the print job (step S509). After that, the WFD connection established between the mobile device 100 and the MFP 201 may be disconnected (steps S211 and S412).

Next, in the mobile device 100, another MFP that may be a new target device may be specified (step S414). Here, it may be assumed that the MFP 202 is specified as the new target device. Then, wireless communication using WFD system may be established between the mobile device 100 and the MFP 202 (steps S106 and S206). After the wireless communication using the WFD system between the mobile device 100 and the MFP 202 is established, the mobile device 100 may generate print data, which have not been printed in the MFP 201, of the print data of the print job that had been entered in the mobile device 100, based on the progress information of the job obtained in steps S410 and S507 (step S404). Nevertheless, in other embodiments, for example, after the mobile device 100 receives the progress information of the job in steps S410 and S507, the processing of step S404 may be performed prior to the establishment of the wireless communication (steps S106 and S206).

After the print data is generated, the mobile device 100 may transmit the print data to the MFP 202 (steps S107 and S207). Upon receipt of the print data, the MFP 202 may perform printing of the print data (step S208). After completing the printing of all pages of the print data, the MFP 202 may transmit a printing completion response to the mobile device 100 (steps S108 and S210). The printing completion response may be transmitted via wireless communication using the WFD system. Upon receipt of the printing completion response from the MFP 202, the mobile device 100 may disconnect the WFD connection established with the MFP 202 (steps S109 and S211). Thus, the series of operation may be completed.

Next, the processes performed by each device that may implement the operations of the image forming system according to a variation of the illustrative embodiment are described. First, a print request process performed in the mobile device 100 is now described. In the print request process according to the variation, a transmission process in FIG. 12 may be performed in step S110 instead of the transmission process in FIG. 7. An explanation is given for a case where an error occurs during printing of a print job in the MFP 201, and an explanation is given for the varying aspects while the same step numbers are assigned in FIG. 12 to the steps that are the same as the steps in FIG. 7.

In step S106, the CPU 51 may return connection confirmation to the MFP that may be the target device determined in step S105 or S414 and establish wireless communication using the WFD system with the target MFP by using the WFD connection information received in step S104. For example, the handover from the NFC system to the WFD system may be implemented. After the wireless communication using the WFD system is established, in step S402, the CPU 51 may determine whether an unfinished print job is present. The CPU 51 may perform this determination based on the information provided by the target MFP. The details of this determination are further described later. When the CPU 51 determines that the progress information of the job has not been received in step S410, the CPU 51 may determine that no unfinished print job is present.

When the CPU 51 determines that no unfinished print job is present (NO in step S402), the routine may move to step S403. In step S403, the application 20 may newly generate print data of a print job. A case where one or more unfinished print jobs are present (YES in step S402) is described later. When the application 20 generates print data, in step S107, the CPU 51 may transmit the print data via wireless communication using the WFD system to the MFP 200.

After step S107, the routine may move to step S406. In step S406, the CPU 51 may determine whether an error has occurred in the target MFP. The occurrence of an error may be determined based on a notification provided by the target MFP. When an error has not occurred (NO in step S406), the routine may move to step S108. In step S108, the CPU 51 may determine whether a printing completion response has been received from the target MFP. While a printing completion response is not received (NO in step S108), the routine may repeat step S406. When the CPU 51 determines that a printing completion response has been received (YES in step S108), in step S109, the CPU 51 may return disconnection confirmation to the target MFP and then disconnect the wireless communication using the WFD system. After that, the routine returns to the print request process and the CPU 51 may end the print request process.

When the CPU 51 determines that an error has occurred in step S406 (YES in step S406), the routine may move to step S410. In step S410, the CPU 51 may receive progress information of the job from the target MFP. The progress information of the job may represent, for example, that an error has occurred during printing of page 5 in the print job including ten pages. After step S410, the routine may move to step S411. In step S411, the CPU 51 may transmit a notification of a cancellation of the printing of the print job to the target MFP.

In step S412, the CPU 51 may disconnect the wireless communication using the WFD system with the target MFP and the routine may move to step S413. In step S413, the CPU 51 may determine whether another target MFP may be present (e.g., connected to the network) other than the MFP having the error. The CPU 51 may determine that another target MFP other than the MFP having the error is present when the WFD connection information received in step S104 comprises the WFD connection information of one or more MFPs other than the MFP having the error.

Figure 6:
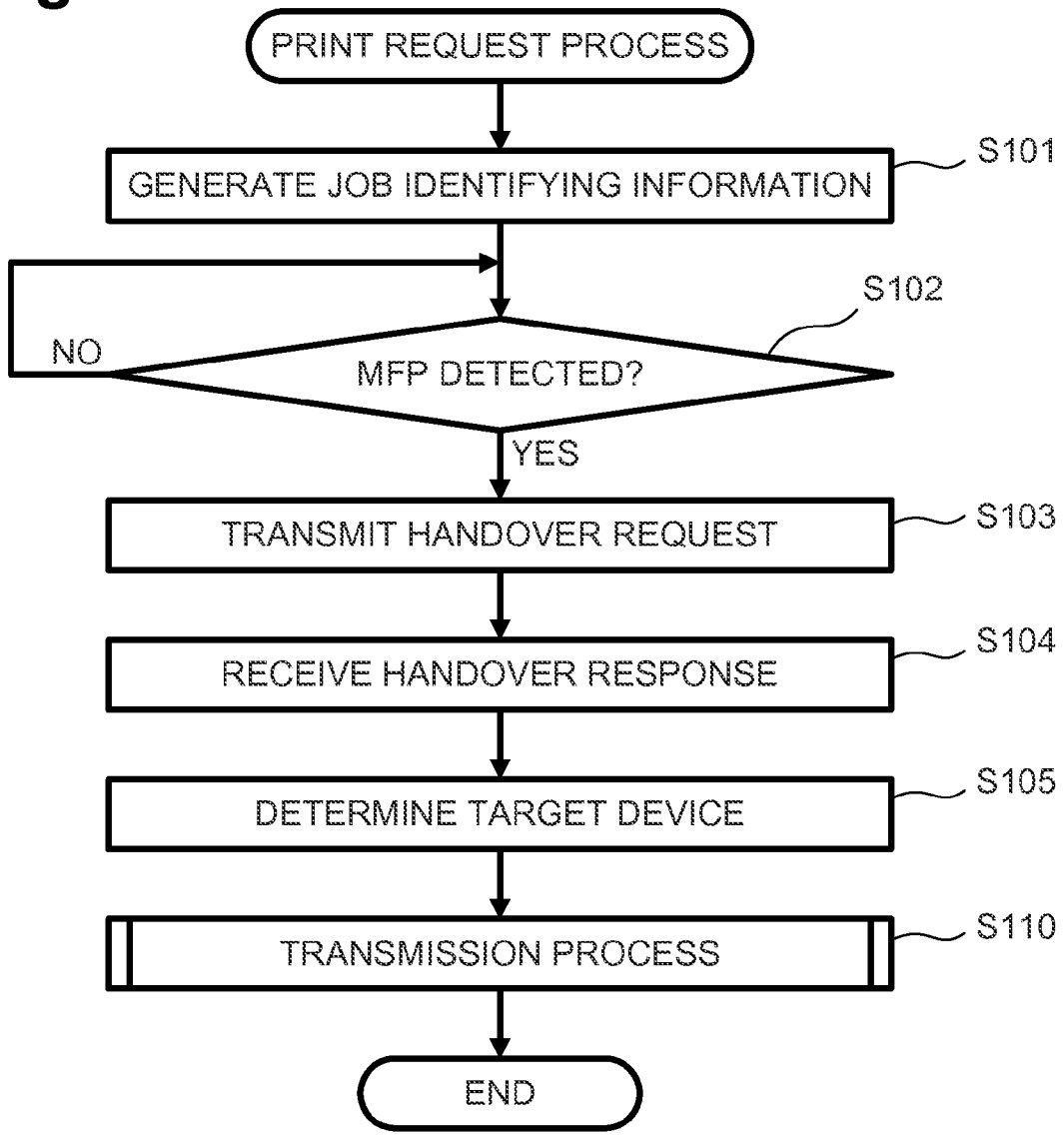
FIG. 6 is a flowchart depicting an example print request process in the illustrative embodiment according to one or more aspects of the disclosure.

When the CPU 51 determines that no other target device is present (NO in step S413), the routine may return to the print request process in FIG. 6 and the CPU 51 may end the print request process. When the CPU 51 determines that another target device is present (YES in step S413), the routine may move to step S414. In step S414, the CPU 51 may determine a new target device with which the mobile device 100 may establish a WFD connection. The CPU 51 may determine the new target device based on a user's instruction inputted via the operating panel 55. Nevertheless, in other embodiments, for example, the CPU 51 may determine that the mobile device 100 is allowed to connect a predetermined new target device. After the new target device is determined, the routine may move to step S106 again.

Hereinafter, the case where one or more unfinished print jobs are present (YES in step S402) is described. In this case, an error has occurred in the MFP (YES in step S406), the processing of steps S410-S414 have been performed. In step S106, the CPU 51 may establish wireless communication with the WFD system between the mobile device 10 and the MFP, e.g., the MFP 202, that may be specified as the new target device in step S414.

Then, in step S402, the CPU 51 may determine whether an unfinished print job is present. The CPU 51 has received the progress information of the job in step S410. Therefore, the CPU 51 may determine that an unfinished print job is present (YES in step S402). Then, the routine may move to step S404. In step S404, the CPU 51 may generate print data of one or more pages that has not been printed yet in the print job, based on the progress information of the job received in step S410. For example, when an error occurs during printing of page 5 in a print job including ten pages, the CPU 51 may generate print data of pages 5-10 in the print job.

Next, a printing process performed in the target MFP is described. In the printing process according to the variation, a printing process in FIG. 13 may be performed instead of the printing process in FIG. 10. An explanation is given for the varying aspects while the same step numbers are assigned in FIG. 13 to the steps that are the same as the steps in FIG. 10.

First, in step S206, the CPU 31 may establish wireless communication using the WFD system between the target MFP and the mobile device 100. For example, the handover from the NFC system to WFD system may be implemented. After the wireless communication with the WFD system is established, the routine may move to step S207. In step S207, the CPU 31 may receive the print data via wireless communication using the WFD system from the mobile device 100. Upon receipt of the print data, in step S208, the CPU 31 may allow the image forming portion 10 to perform printing of the print data. After the printing is started, in step S502, the CPU 31 may determine, based on a detection signal outputted from the sensor 70, whether an error has occurred. When an error has not occurred (NO in step S502), the routine may move to step S209. In step S209, the CPU 31 may determine whether all pages of the received print job has been printed. When all pages of the received print job have not been printed (NO in step S209), the routine may move to step S502. When all pages of the received print job has been printed (YES in step S209), the routine may move to step S210. In step S210, the CPU 31 may transmit a printing completion response to the mobile device 100.

After step S210, in step S211, the CPU 31 may disconnect the wireless communication using the WFD system established between the target MFP and the mobile device 100 after receiving disconnection confirmation from the mobile device 100. After step S211, the CPU 31 may end the printing process.

When the CPU 31 determine that an error has occurred (YES in step S502), the routine may move to step S506. In step S506, the CPU 31 may allow the image forming portion 10 to discontinue the printing currently being performed. Then, in step S507, the CPU 31 may transmit error information and progress information of the job to the mobile device 100. The progress information of the job may represent, for example, that an error has occurred in page 5 of the 10-page print job, as described above.

In step S508, the CPU 31 may determine whether a cancellation notification of the print job has been received from the mobile device 100. When a cancellation notification has not been received (NO in step S508), the routine may move to step S508. When a cancellation notification has been received (step S508:YES), the routine may move to step S509. In step S509, the CPU 31 may cancel the execution of the print job. After step S509, the routine may move to step S211. In step S211, the CPU 31 may disconnect the WFD connection established between the target MFP and the mobile device 100. After that, the CPU 31 may end the printing process.

As described above, according to the above-described variation, in the image forming system 900, the mobile device 100 may receive the progress information of the job when an error has occurred during printing (step S410), and transmit print data of the print job that has not been printed yet due to the error (S404 and S107). Therefore, when an error occurs in an MFP that is in the process of printing of a print job, the printing of the rest of print data of the print job may be continued by another MFP through a handover. Thus, this configuration may increase user convenience.

While the disclosure has been described in detail with reference to the specific embodiment thereof, this is merely an example, and various changes, arrangements and modifications may be applied therein without departing from the spirit and scope of the disclosure. For example, the aspects of the disclosure may also be applied to devices that may not have an image reading function, as well as MFPs.

In the illustrative embodiments, the explanation has been given by taking, as an example, the wireless communication in accordance with WFD performed by the wireless LAN interface 38, e.g., wireless communication that may be directly performed without the need for an access point and in which wireless devices may perform one-to-one data communication, e.g., transmission and reception, exclusively. In other embodiments, for example, wireless communication in accordance with Wi-Fi®, e.g., wireless communication that may be indirectly performed with the need for an access point and in which wireless devices may perform one-to-may data communications.

In the illustrative embodiments, the MFPs 200, 201, and 202 may be configured to transmit or receive data thereamong via wired communication. Nevertheless, in other embodiments, for example, the MFPs 200, 201, and 202 may be configured to transmit or receive data thereamong via wireless communication.

In the illustrative embodiments, when the mobile device 100 is held over the MFP 200, the WFD connection information of the MFP 200 and the WFD connection information of the MFPs 201 and 202 may be transmitted to the mobile device 100. Nevertheless, in other embodiment, for example, the WFD connection information of the MFP 200 may not be unnecessarily transmitted to the mobile device 100.

In the illustrative embodiments, the print request process and the transmission process may be performed by the CPU 51, and the response process, the target-device determination process, and the printing process may be performed by the CPU 31. Nevertheless, in other embodiments, for example, the processes disclosed in the above-described illustrative embodiments may be performed by a plurality of CPUs, hardware, for example, a special application specific integrated circuit ("ASIC"), or a combination of one or more CPUs and one or more ASICs. Further, the processes disclosed in the above-described illustrative embodiments may be implemented by various manners, for example, by executing one or more programs stored on computer-readable storage media or by methods.

What is claimed is:

1. An information processing apparatus comprising:
a first communication device configured to communicate using a first communication protocol;
a second communication device configured to communicate using a second communication protocol;
a processor; and
memory storing computer readable instructions that, when executed, cause the information processing apparatus to:
establish a first connection with a first image processing apparatus through the first communication device using the first communication protocol;
while maintaining the first connection:
transmit a handover request to the first image processing apparatus; and
receive, from the first image processing apparatus through the first communication device, connection information for establishing communication through a second connection according to the second communication protocol between the information processing apparatus and each of a plurality of image processing apparatuses, the plurality of image processing apparatuses including the first image processing apparatus and a second image processing apparatus different from the first image processing apparatus;
determine a selection of an image processing apparatus with which the information processing apparatus is to establish communications, from the plurality of image processing apparatuses, the selection being made based on receiving a user selection from the plurality of image processing apparatuses;
after determining the selection of the image processing apparatus, establish, through the second communication device by using the received connection information and the second communication protocol, the communication through the second connection between the information processing apparatus and the selected image processing apparatus; and
request, via the established communication through the second connection between the information processing apparatus and the selected image processing apparatus, image processing by the selected image processing apparatus.

2. The information processing apparatus of claim 1, wherein the first communication device and the second communication device are parts of a single communication unit.

3. The information processing apparatus of claim 1, wherein the first communication protocol is a short-range communication protocol and the second communication protocol is a long-range communication protocol.

4. The information processing apparatus of claim 1, wherein the selection is further made by the first image processing apparatus based on physical printing capabilities of each of the plurality of image processing apparatuses, the physical printing capabilities of each of the plurality of image processing apparatuses including a print amount restriction.

5. The information processing apparatus of claim 4, wherein the print amount restriction includes a user-specific printing restriction.

6. The information processing apparatus according to claim 1, wherein the computer readable instructions, when executed, further cause the information processing apparatus to:
detect an occurrence of an error in the second image processing apparatus; and
in response to detecting the occurrence of the error, establish a third connection with a third image processing apparatus other than the second image processing apparatus in which the error is detected and the first image processing apparatus.

7. The information processing apparatus according to claim 6, wherein the computer readable instructions, when executed, further cause the information processing apparatus to:
obtain progress information of image processing from the second image processing apparatus in which the error is detected; and
transmit print data, which has not been processed, in the image processing, by the second image processing apparatus, to the third image processing apparatus through the second communication device using the second communication protocol.

8. An image processing apparatus comprising:
at least one of a scanner and an image forming device;
a first communication device configured to communicate using a first communication protocol;
a second communication device configured to communicate using a second communication protocol;
a processor; and
memory storing computer readable instructions that, when executed, cause the image processing apparatus to:
establish a first connection with an information processing apparatus through the first communication device using the first communication protocol;
while maintaining the first connection:
receive, as part of a handover request, information relating to image processing from the information processing apparatus through the first connection;
in response to the handover request:
determine connection information for establishing a second connection to at least one other image processing apparatus, wherein the connection information corresponds to the second communication protocol;

select at least one other image processing apparatus with which the information processing apparatus is to establish communications, from a plurality of image processing apparatuses, the selection being made based on receiving a user selection from the plurality of image processing apparatuses; and transmit, to the information processing apparatus using the first communication protocol, the connection information for establishing the second connection to the at least one other image processing apparatus and connection information for the image processing apparatus, wherein the connection information for the image processing apparatus corresponding to the second communication protocol.

9. The image processing apparatus of claim 8, wherein the first communication device and the second communication device are parts of a single communication unit.

10. The image processing apparatus of claim 8, wherein the first communication protocol is a short-range communication protocol and the second communication protocol is a long-range communication protocol.

11. The image processing apparatus of claim 8, wherein the computer readable instructions, when executed, further cause the image processing apparatus to:

determine the connection information from the at least one other image processing apparatus using a third communication protocol different form the first and second communication protocols.

12. The image processing apparatus according to claim 9, wherein transmitting the connection information includes:

obtaining connection availability information which indicates whether each of the plurality of image processing apparatuses is allowed to connect with the information processing apparatus; and transmitting the connection information of the at least one other image processing apparatus that is allowed to connect with the information processing apparatus, of the plurality of image processing apparatuses, based on the connection availability information.

13. The image processing apparatus according to claim 8, wherein transmitting the connection information includes:

obtaining image processing availability information indicating whether each of the plurality of image processing apparatuses is able to perform the image processing; and transmitting the connection information of the at least one other image processing apparatus that is able to perform the image processing, of the plurality of image processing apparatuses, based on the image processing availability information.

14. A method comprising:

establish, by a first image processing apparatus having at least one of a scanner and an image forming device, a first connection with an information processing apparatus through a first communication device using a first communication protocol;

while maintaining the first connection:

receiving, by the first image processing apparatus, a handover request including information relating to image processing from the information processing apparatus through the first connection;

in response to the handover request:

determine connection information for establishing a second connection to a second image processing apparatus, wherein the connection information corresponds to a second communication protocol different from the first communication protocol;

selecting the second image processing apparatus with which the information processing apparatus is to establish communications, from a plurality of image processing apparatuses, the selection being made based on receiving a user selection from the plurality of image processing apparatuses; and transmitting, from the first image processing apparatus to the information processing apparatus using the first communication protocol, the connection information for establishing the second connection to the second image processing apparatus and connection information for connecting to the first image processing apparatus using the second communication protocol.

15. The method of claim 14, wherein the first communication protocol is a short-range communication protocol and the second communication protocol is a long-range communication protocol.

16. The method of claim 14, further comprising:

determining the connection information from the second image processing apparatus using a third communication protocol different from the first and second communication protocols.

17. The method of claim 14, further comprising:

obtaining connection availability information which indicates whether each of the plurality of image processing apparatuses is allowed to connect with the information processing apparatus; and transmitting the connection information of the second image processing apparatus that is allowed to connect with the information processing apparatus, of the plurality of image processing apparatuses, based on the connection availability information.

18. The method of claim 14, further comprising:

obtaining image processing availability information indicating whether each of the plurality of image processing apparatuses is able to perform the image processing; and transmitting the connection information of at least one of the plurality of image processing apparatuses that is able to perform the image processing based on the image processing availability information.

19. The method of claim 18, further comprising selecting, by the image processing apparatus, the at least one of the plurality of image processing apparatuses based on the image processing availability information.

* * * * *